US010620453B2

(12) United States Patent
Kikuchi et al.

(10) Patent No.: US 10,620,453 B2
(45) Date of Patent: Apr. 14, 2020

(54) SPECTACLE LENS

(71) Applicant: HOYA LENS THAILAND LTD., Prachatipat, Thanyaburi, Pathumthani (TH)

(72) Inventors: Yoshihiro Kikuchi, Tokyo (JP); Kenta Ueoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/538,565

(22) PCT Filed: Dec. 24, 2015

(86) PCT No.: PCT/JP2015/085926
§ 371 (c)(1),
(2) Date: Jun. 21, 2017

(87) PCT Pub. No.: WO2016/104558
PCT Pub. Date: Jun. 30, 2016

(65) Prior Publication Data
US 2018/0157061 A1   Jun. 7, 2018

(30) Foreign Application Priority Data

Dec. 26, 2014   (JP) .................................. 2014-266507

(51) Int. Cl.
| *G02C 3/00* | (2006.01) |
| *G02C 7/02* | (2006.01) |
| *G02C 7/00* | (2006.01) |
| *G02C 7/06* | (2006.01) |
| *B24B 13/005* | (2006.01) |

(52) U.S. Cl.
CPC ............. *G02C 7/021* (2013.01); *G02C 7/061* (2013.01); *B24B 13/0055* (2013.01)

(58) Field of Classification Search
CPC . G02C 7/021; G02C 7/02; G02C 7/14; G02C 7/061; G02C 7/06; G02C 7/04; A61B 3/1005; B24B 9/146
USPC ............ 351/159.69, 159.01, 159.58, 159.42, 351/159.45, 159.73–159.77, 159.8
See application file for complete search history.

(56) References Cited

U.S. PATENT DOCUMENTS 6,837,580 B2   1/2005 Senda et al.
2001/0035937 A1* 11/2001 Mizuno ............... B24B 13/0055
351/159.01

(Continued)

FOREIGN PATENT DOCUMENTS

DE   20 2007 019 461 U1   11/2012
JP   H11-337887 A   12/1999

(Continued)

OTHER PUBLICATIONS

Jun. 27, 2017 International Preliminary Report on Patentability issued in International Patent Application No. PCT/JP2015/085926.

(Continued)

*Primary Examiner* — Dawayne Pinkney
(74) *Attorney, Agent, or Firm* — Oliff PLC (57) ABSTRACT

In a spectacle lens including a permanent mark arranged on a concave surface, a layout mark indicating a predetermined reference position on a convex surface is arranged on the convex surface.

5 Claims, 5 Drawing Sheets

(56) References Cited

U.S. PATENT DOCUMENTS

| | | | |
|---|---|---|---|
| 2003/0107704 A1* | 6/2003 | Senda | G02C 7/021 |
| | | | 351/159.42 |
| 2005/0042977 A1* | 2/2005 | Kawase | B24B 9/14 |
| | | | 451/41 |
| 2008/0047488 A1* | 2/2008 | Minor | B29D 11/00884 |
| | | | 118/713 |
| 2016/0325393 A1* | 11/2016 | Daimaru | B24B 9/146 |

FOREIGN PATENT DOCUMENTS

| | | |
|---|---|---|
| JP | 2000-019463 A | 1/2000 |
| JP | 2000-258732 A | 9/2000 |
| JP | 2003-131175 A | 5/2003 |
| JP | 2003-131176 A | 5/2003 |
| JP | 2004-347947 A | 12/2004 |
| JP | 2008-116510 A | 5/2008 |
| JP | 4596454 B2 | 12/2010 |
| WO | 2006/101184 A1 | 9/2006 |
| WO | 2014/131879 A1 | 9/2014 |

OTHER PUBLICATIONS

Mar. 8, 2016 Search Report issued in International Patent Application No. PCT/JP2015/085926.
Jul. 27, 2018 Extended European Search Report issued in European Patent Application No. 15873126.5.
Machine Generated English Translation of DE 20 2007 019 461 U1.
Feb. 21, 2019 Office Action issued in Japanese Patent Application No. 2014-266507.

* cited by examiner

SPECTACLE LENS

TECHNICAL FIELD

The present invention relates to a spectacle lens provided with a layout mark.

BACKGROUND ART

The JIS standard defines that permanent marks such as alignment reference marks (for example, a pair of hidden marks) need to be applied to some spectacle lenses including a progressive power spectacle lens by using a method that prevents the marks from disappearing easily (for example, etching). Meanwhile, for example, a layout mark indicating a layout of a predetermined reference position such as a power measurement position is optionally provided for some products according to an agreement among manufacturers. Typically, the layout mark is provided by painting which can be removed and, for example, it is removed after process of cutting lens is applied. JP 4596454 B1 (hereinafter, regarded as "Patent Literature 1" for convenience) discloses a specific example of the spectacle lens provided with the layout mark of such a type.

The spectacle lens disclosed in Patent Literature 1 is a lens whose convex surface is formed as a progressive surface (hereinafter, regarded as "convex surface progressive power lens" for convenience). In the convex surface progressive power lens disclosed in Patent Literature 1, a pair of the hidden marks (permanent marks) is placed on the convex surface and the layout mark is painted on the same convex surface.

SUMMARY OF INVENTION

The convex surface progressive power lens is formed by, for example, processing a concave surface of a semi-finished lens blank as spherical or toric surface, which includes convex surface having a progressive refractive power. The optical performance of the convex surface progressive power lens as the progressive refractive power is determined by the convex surface. As shown in Patent Literature 1, in the case of a lens whose optical performance as the progressive refractive power is determined by the convex surface, the permanent mark such as the alignment reference mark is also placed on the convex surface. Meanwhile, in an optician's shop or the like, an operator who handles the convex surface progressive power lens uses the layout mark provided on the convex surface to locate the power measurement position when measuring power or checking a fitting point with a lens meter after the process of cutting lens.

Incidentally, there is a center of design of lens on the convex surface in the spectacle lens. Although a geometric center of lens serves as a representative center of lens design, the de-centering design from the geometric center is desired in some cases depending on specifications. However, because a progressive refractive power surface is fixed on the convex surface in the convex surface progressive power lens, it is difficult to make the design center of lens move.

On the other hand, a lens whose concave surface is formed as the progressive surface (hereinafter, regarded as "concave surface progressive power lens" for convenience) has been also known among the progressive power spectacle lenses. The concave surface progressive power lens is formed by, for example, processing the concave surface of a semi-finished lens blank as progressive surface, which includes convex surface having a spherical power. In the lens of this type, the design center of lens specified on the convex surface can be freely de-centered according to the processing of the concave surface. Taking such an advantage into account, manufacturers sometimes design and produce the progressive power lens as the concave surface progressive power lens rather than the convex surface progressive power lens. In the case of the concave surface progressive power lens, the permanent mark such as the alignment reference mark is usually placed on the concave surface since the optical performance is determined by a surface to be processed, specifically, the concave surface.

Here, in an optician's shop or the like, an operator who handles the concave surface progressive power lens, for example, puts marks at positions on the convex surface from which the permanent marks placed on the concave surface are visually confirmed (a position of a virtual image of the permanent mark appearing on the convex surface) by using markers or the like and then uses the marks that have been located in the power measurement position when measuring power or checking the fitting point with a lens meter after the process of cutting lens.

However, the position of the virtual image of the permanent mark appearing on the convex surface is shifted off from a proper position where the virtual image is supposed to appear, depending on parallax due to refraction or the like, an angle at which the operator visually confirms the convex surface and so on. Accordingly, it is difficult for operators to accurately measure power and check the fitting point with a lens meter for some spectacle lenses including the concave surface progressive power lens.

A spectacle lens according to one embodiment of the invention is a spectacle lens including a permanent mark arranged on a concave surface, in which a layout mark indicating a predetermined reference position on a convex surface is arranged on the convex surface.

According to one embodiment of the invention, the operator can directly locate the predetermined reference position on the convex surface by using information on the convex surface side (layout mark) instead of information on the concave surface side (permanent mark). Consequently, for example, the accuracy of power measurement and check of the fitting point with the lens meter is improved.

Meanwhile, in one embodiment of the invention, for example, respective positions of the permanent marks and the layout marks are defined in such a manner that one position is defined on the basis of the other position.

In addition, in one embodiment of the invention, a reference position on the concave surface defined on the basis of the permanent mark and the reference position on the convex surface indicated by the layout mark may be arranged in such a manner that one reference position is arranged at a position on a normal line or a straight line substantially forming the normal line at the other reference position.

Furthermore, in one embodiment of the invention, the permanent marks may be arranged as a pair and arranged at positions on the concave surface indicated by one of conditions (1) and (2):

(1) a pair of positions on the concave surface located on straight lines parallel to a normal line or a straight line substantially forming the normal line at a reference position on the concave surface while sandwiching one of the reference position on the concave surface and the reference position on the convex surface; and (2) a pair of positions on the concave surface located on straight lines parallel to a normal line or a straight line substantially forming the normal line at the reference position on the convex surface while sandwiching one of the reference position on the concave surface and the reference position on the convex surface.

Additionally, in one embodiment of the invention, for example, the permanent marks are arranged on the concave surface as a pair. In this case, the layout mark may be positioned at a midpoint on a line connecting virtual images of the pair of the permanent marks appearing on the convex surface when the convex surface is viewed from a predetermined direction.

In addition, a spectacle lens according to one embodiment of the invention is a spectacle lens including a pair of permanent marks arranged on a concave surface, in which positions of the pair of permanent marks on the concave surface are determined such that a predetermined reference position on a convex surface is located at a midpoint on a line connecting virtual images of the pair of the permanent marks appearing on the convex surface when the convex surface is viewed from a predetermined direction.

Meanwhile, a spectacle lens according to one embodiment of the invention is a spectacle lens either including a concave surface shape of non-symmetry or including a concave surface shape including only one symmetric plane, in which a layout mark indicating a predetermined reference position on a convex surface is arranged on the convex surface.

According to one embodiment of the invention, the operators can directly locate the predetermined reference position on the convex surface by using information on the convex surface side (layout mark) instead of information on the concave surface side (permanent mark). Consequently, for example, the accuracy of power measurement and check of the fitting point with a lens meter is improved.

DESCRIPTION OF EMBODIMENTS

Hereinafter, a spectacle lens according to an embodiment of the invention will be described with reference to the drawings.

[Configuration of Uncut Lens 1]

Figure 1A:
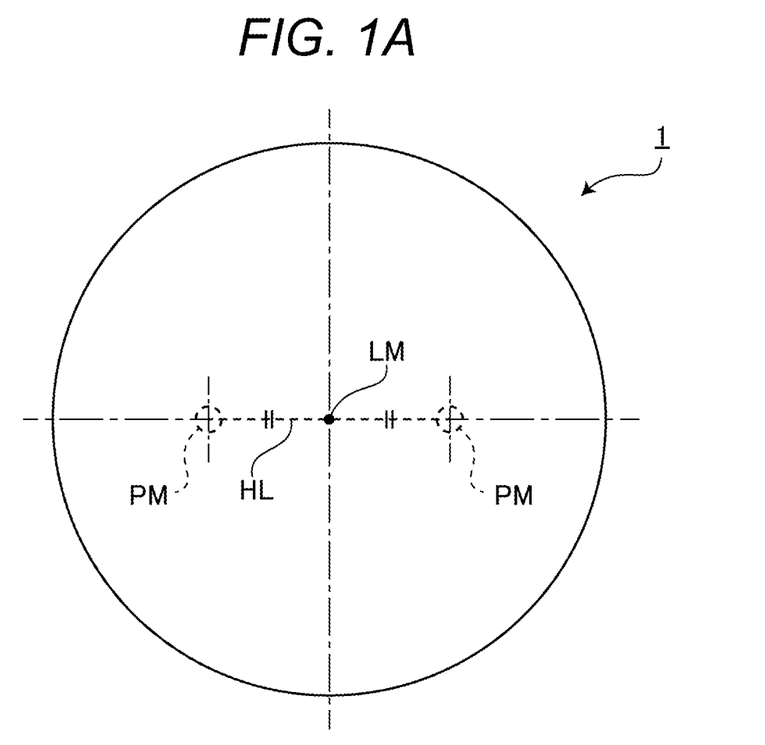
FIGS. 1A and 1B are diagrams illustrating an uncut lens according to an embodiment of the invention.
Figure 1B:
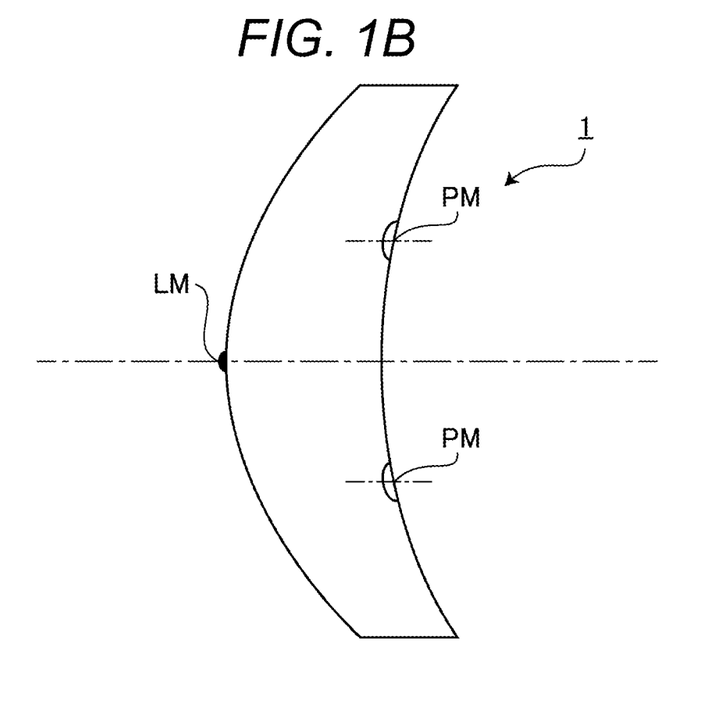

FIGS. 1A and 1B are diagrams illustrating an uncut lens 1 produced by a manufacturer. FIG. 1A illustrates a diagram of the uncut lens 1 when viewed from the front on a convex surface side, whereas FIG. 1B illustrates a horizontal cross-sectional view including PM points in FIG. 1A.

Illustratively, the uncut lens 1 includes the convex surface having a spherical surface shape and a concave surface having a surface shape of non-symmetry. The surface shape of non-symmetry refers to a surface shape not having either axial symmetry or plane symmetry and is exemplified as a progressive surface shape. In the uncut lens 1, as illustrated in FIGS. 1A and 1B, a pair of permanent marks PM is etched on the concave surface and a layout mark LM is painted on the convex surface. Note that, in the embodiment, the progressive surface is not limited to a surface solely having a progressive power but, for example, may be an integrated surface having the progressive power and another refractive power (e.g., astigmatism power).

An example of the permanent mark PM is an alignment reference mark defined by the JIS standard. An imaginary line connecting virtual images of the pair of the permanent marks PM appearing on the convex surface (a dotted line in FIG. 1A) is a line indicating a horizontal direction of a lens and hereinafter regarded as "horizontal reference line HL" for convenience.

The layout mark LM is a mark indicating a predetermined reference position such as a power measurement position (in more detail, one reference position or a layout of a plurality of reference positions) and, in the embodiment, painted at a prism measurement reference position on the convex surface. Ink used for the layout mark LM is of a type that can be removed through easy work.

In addition, a mark other than the permanent mark PM and the layout mark LM like a quality assurance mark is also affixed to the uncut lens 1. Description of a mark other than the permanent mark PM and the layout mark LM will be omitted here for convenience of description.

As illustrated in FIG. 1A, the layout mark LM is provided at a position overlapping a midpoint on the horizontal reference line HL when the uncut lens 1 is viewed from the front on the convex surface side (viewed from a normal line direction at a geometric center of the convex surface having a spherical surface). Distances from the layout mark LM to the respective permanent marks PM are equal to each other on the horizontal reference line HL and uniformly set to 17 mm.

In regard to the uncut lens 1 delivered from a manufacturer, an operator in an optician's shop or the like points a lens meter to the layout mark LM (prism measurement reference position) painted on the convex surface or another power measurement position located from the layout mark LM to measure power or check a fitting point after process of cutting lens. Note that the layout marks LM may be painted directly at respective power measurement positions for far vision, near vision and so on. The layout mark LM is wiped away with ether or the like after all inspection by the operator is finished.

It is also considered here to paint the layout mark on the concave surface similarly as the permanent mark PM etched on the concave surface. However, it is difficult to accurately work out power at the power measurement position on the convex surface by pointing a lens meter or the like to the layout mark on the concave surface. In addition, the fitting point can only be checked from the convex surface side. A position of the virtual image of the layout mark appearing on the convex surface varies from a proper position where the virtual image is supposed to appear, depending on parallax due to refraction or the like, an angle at which the operator visually confirms the convex surface and so on. Accordingly, it is difficult to accurately check the fitting point. Additionally, the position of the virtual image of the layout marks varies to a larger extent from a proper position where the virtual image is supposed to appear when the uncut lens 1 has a larger value of each of a refractive index, a curve, and a thickness.

By taking such a situation into consideration, even though the uncut lens 1 according to the embodiment is a lens in which the permanent mark PM is etched on the concave surface, the layout mark LM indicating the reference position such as the power measurement position is painted on the convex surface. In the uncut lens 1 according to the embodiment, an operator can directly locate the reference position such as the power measurement position by using information on the convex surface side (layout mark LM) instead of information on the concave surface side (permanent mark PM). Consequently, it is possible to avoid the degradation of the accuracy of power measurement and check of the fitting point caused by parallax due to refraction or the like and variations in mark position due to the angle of visual confirmation.

According to another viewpoint, the positions of the pair of the permanent marks PM on the concave surface are determined such that the layout mark LM (prism measurement reference position) is positioned at the midpoint on the horizontal reference line HL when the uncut lens 1 is viewed from the front on the convex surface side. As a result, even in a case where the layout mark LM is not provided in the uncut lens 1, the operator can accurately locate the prism measurement reference position by viewing the uncut lens 1 from the front on the convex surface side. That is, even an uncut lens in which the layout mark LM is not provided but the pair of the permanent marks PM are arranged on the above-described positions is also included in the scope of the spectacle lens according to the invention.

[Producing Processes for Uncut Lens 1]

FIGS. 2A to 2D are diagrams schematically illustrating producing processes for the uncut lens 1. In the embodiment, the uncut lens 1 is produced by using, for example, a semi-finished lens blank which includes convex surface having a spherical surface shape.

First, in these producing processes, an optimum semi-finished lens blank is selected on the basis of lens data. The selected semi-finished lens blank is set in a processing machine 100 (refer to FIG. 2A).

Figure 2A:
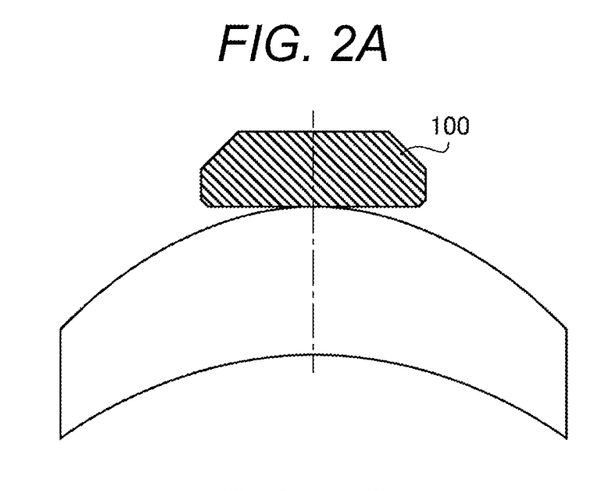
FIGS. 2A to 2D are diagrams schematically illustrating producing processes for the uncut lens according to the embodiment of the invention.
Figure 2B:
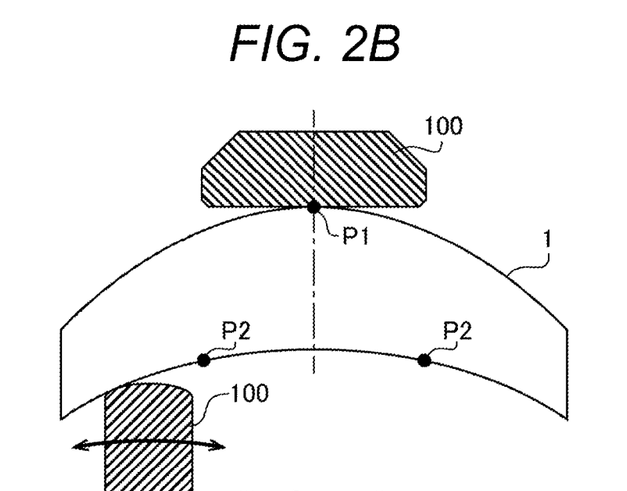
Figure 2C:
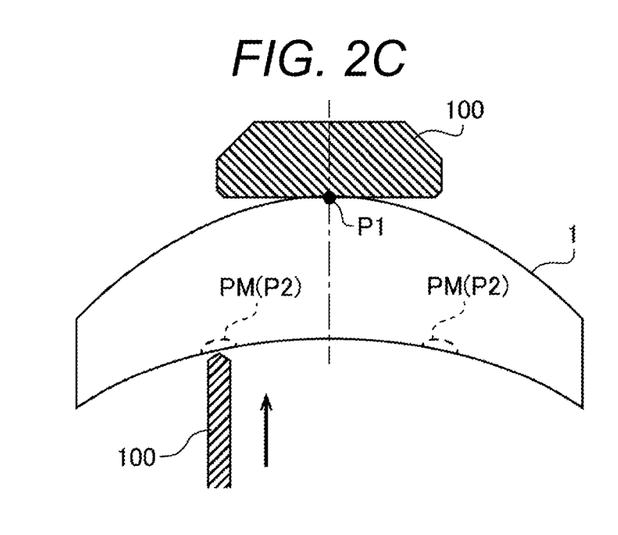
Figure 2D:
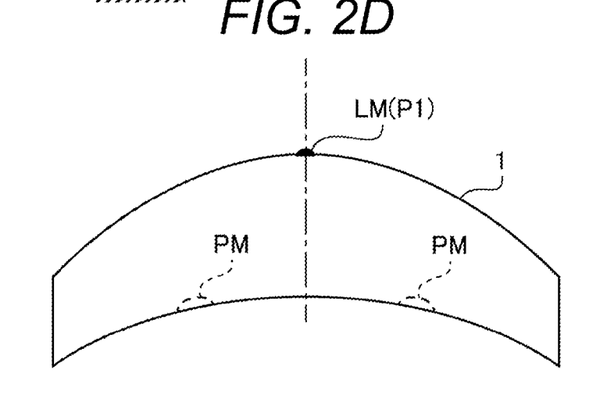

The processing machine 100 cuts and polishes the concave surface of the set semi-finished lens blank in accordance with lens design data (refer to FIG. 2B). Once the concave surface shape is settled through cutting and polishing by the processing machine 100, as illustrated in FIG. 2B, a prism measurement reference position P1 appears at a predetermined position on the convex surface defined by the lens design data and simultaneously, etching planned positions P2 where the permanent marks PM are supposed to be etched appear at predetermined positions on the concave surface similarly defined by the lens design data.

After the uncut lens 1 is taken off the processing machine 100 when cutting and polishing by the processing machine 100 is completed, the accurate positions of the prism measurement reference position P1 and the etching planned positions P2 become difficult to identify. Particularly, as for the prism measurement reference position P1, because the convex surface of the uncut lens 1 has a spherical surface and thus, a characteristic in shape such as a point of inflection is not present therein, accurate locating through visual confirmation by the operator is difficult. Meanwhile, the processing machine 100 can accurately locate the prism measurement reference position P1 and the etching planned positions P2 on the basis of the lens design data unless the uncut lens 1 is taken off the processing machine 100 (as long as a positional relationship at a time of the processing is maintained). In these producing processes, the permanent mark PM is etched at each of the pair of the etching planned positions P2 on the basis of the lens design data before the uncut lens 1 is taken off the processing machine 100 (refer to FIG. 2C).

The uncut lens 1 is taken off the processing machine 100 after the permanent marks PM are etched and then, various types of coating such as dyeing processing, hard coat processing, an anti-reflection film, and ultraviolet ray blocking are applied thereto. The positional relationship between the prism measurement reference position P1 and the pair of the permanent marks PM is known by design. The layout mark LM is painted at the prism measurement reference position P1 specified from the positional relationship with the pair of the permanent marks PM etched on the concave surface when, for example, the uncut lens 1 is shipped (refer to FIG. 2D).

[Positional Relationship Between Permanent Marks PM and Layout Mark LM]

There are different types of variations in the positional relationship between the permanent marks PM and the layout mark LM. FIG. 3 to FIG. 8 are diagrams illustrating lateral cross sections of the uncut lens 1 and show a first variation to a sixth variation of the positional relationship between the permanent marks PM and the layout mark LM, respectively.

Figure 3:
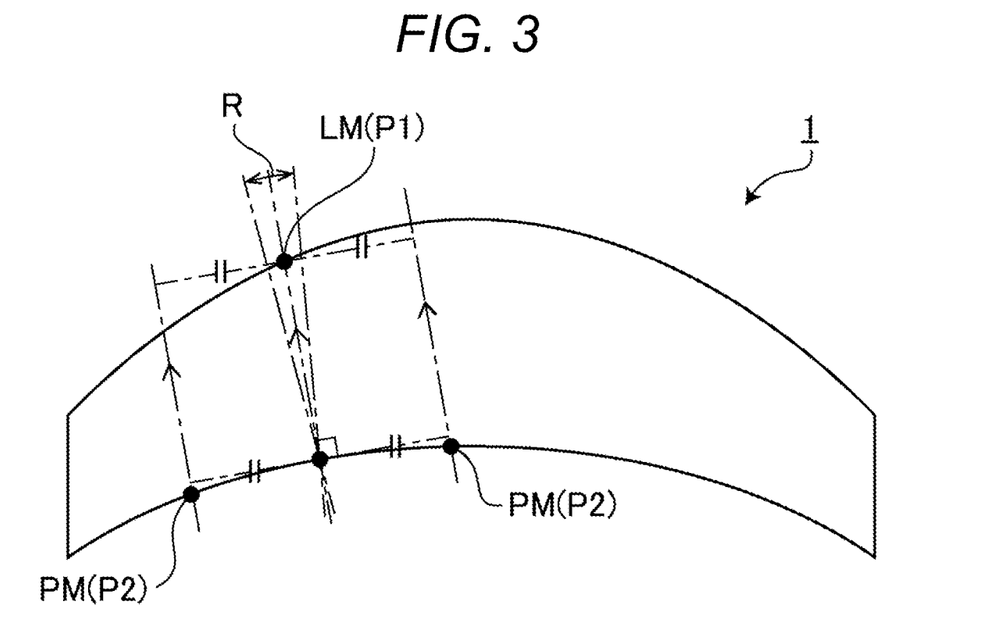
FIG. 3 is a diagram illustrating a positional relationship between permanent marks etched on a concave surface of the uncut lens according to the embodiment of the invention and a layout mark LM painted on a convex surface thereof (first variation).

(FIG. 3: First Variation)

The positional relationship according to the first variation is specified from the following conditions A and a.

Condition A

The layout mark LM (the reference position on the convex surface, namely, the prism measurement reference position P1) is arranged at a position on a normal line or a straight line substantially forming the normal line at the reference position on the concave surface (for example, a design reference position on the concave surface). Here, the "straight line substantially forming the normal line at the reference position" represents a straight line intersecting with this reference position and having a slope of ±5° or less relative to the normal line at this reference position. In other words, the layout mark LM is arranged at a position contained within a circular region R illustrated in FIG. 3, which has a slope of ±5°. The value of the slope (±5° or less) is calculated by taking, for example, framing tolerance for the spectacle lens into account and it is more preferable to be ±1° or less.

Condition a

The pair of the permanent marks PM is arranged at positions on a pair of straight lines parallel to the normal line or a straight line substantially forming the normal line at the reference position on the concave surface, which straight lines are located at the same distance from the reference position on the concave surface (or on the convex surface) while sandwiching the reference position on the concave surface (or on the convex surface).

Figure 4:
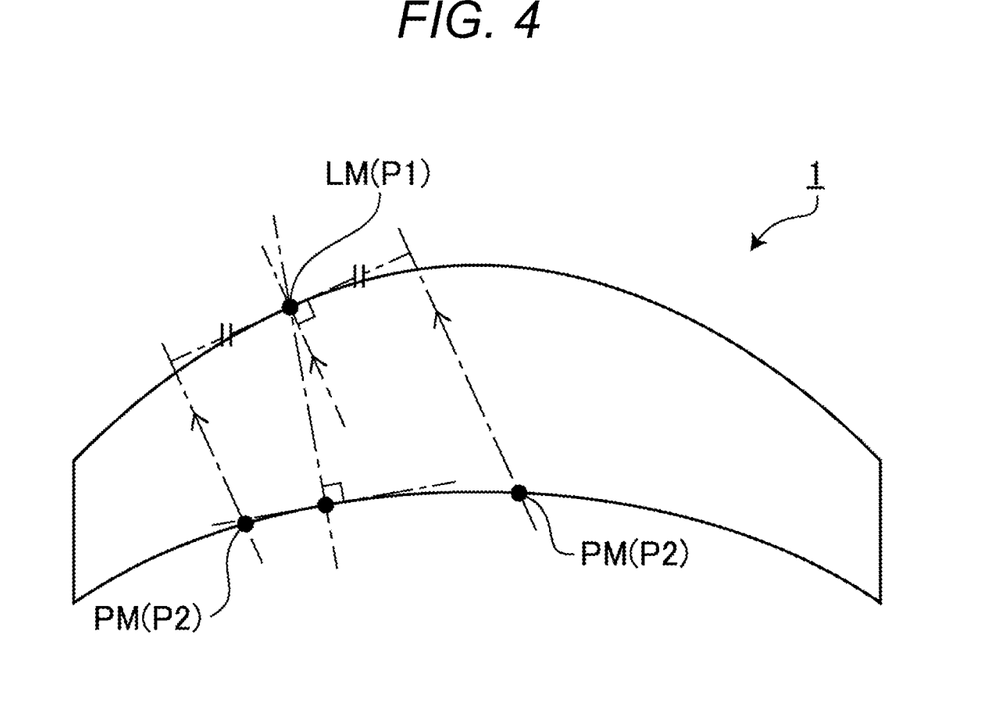
FIG. 4 is a diagram illustrating a positional relationship between the permanent marks etched on the concave surface of the uncut lens according to the embodiment of the invention and the layout mark LM painted on the convex surface thereof (second variation).

(FIG. 4: Second Variation)

The positional relationship according to the second variation is specified from the condition A and the following condition b.

Condition b

The pair of the permanent marks PM is arranged at positions on a pair of straight lines parallel to the normal line or a straight line substantially forming the normal line at the reference position on the convex surface, which straight lines are located at the same distance from the reference position on the convex surface while sandwiching the reference position on the convex surface.

Figure 5:
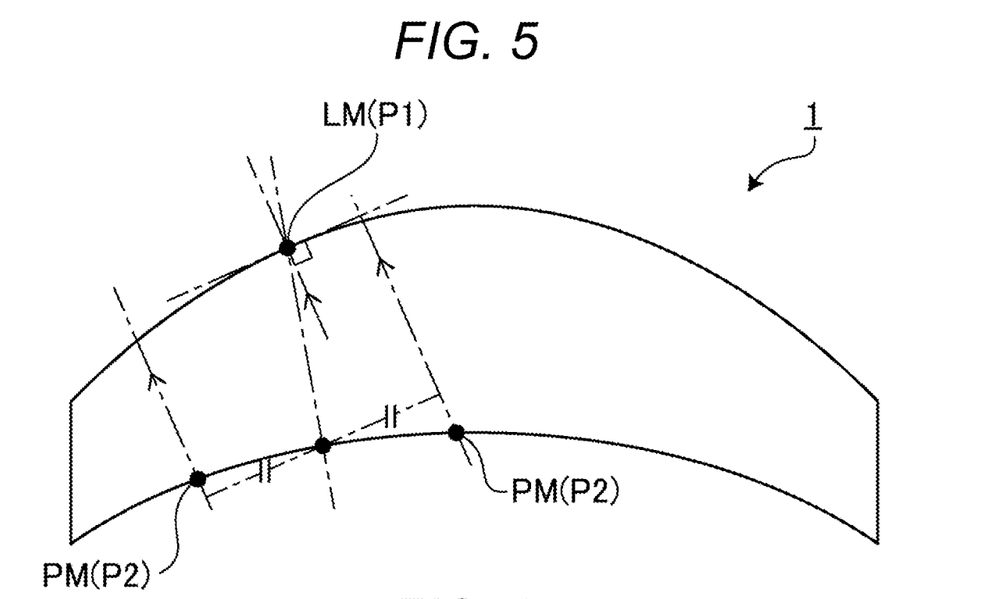
FIG. 5 is a diagram illustrating a positional relationship between the permanent marks etched on the concave surface of the uncut lens according to the embodiment of the invention and the layout mark LM painted on the convex surface thereof (third variation).

(FIG. 5: Third Variation)

The positional relationship according to the third variation is specified from the condition A and the following condition c.

Condition c

The pair of the permanent marks PM is arranged at positions on a pair of straight lines parallel to the normal line or a straight line substantially forming the normal line at the reference position on the convex surface, which straight lines are located at the same distance from the reference position on the concave surface while sandwiching the reference position on the concave surface.

Figure 6:
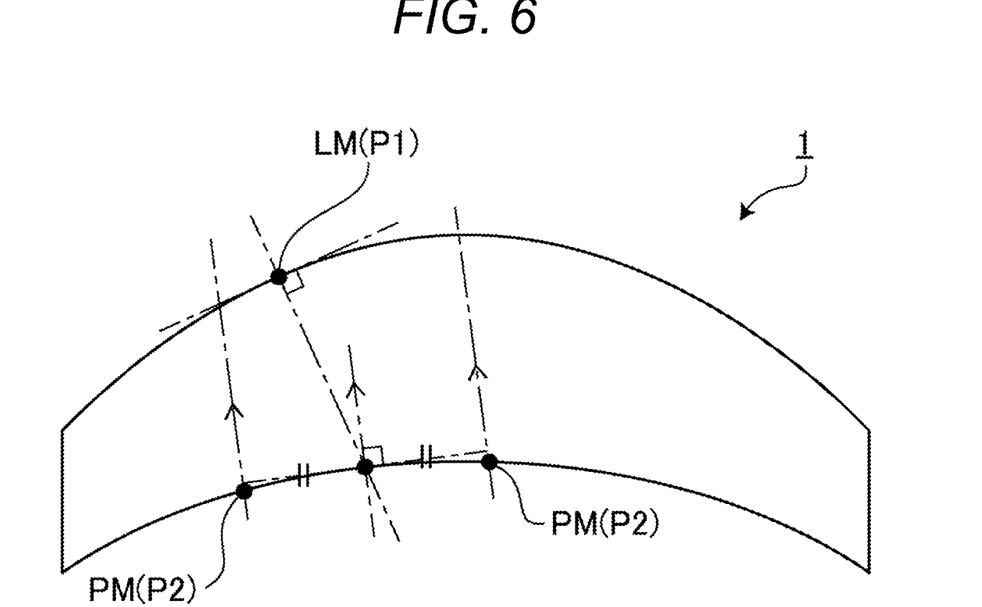
FIG. 6 is a diagram illustrating a positional relationship between the permanent marks etched on the concave surface of the uncut lens according to the embodiment of the invention and the layout mark LM painted on the convex surface thereof (fourth variation).

(FIG. 6: Fourth Variation)

The positional relationship according to the fourth variation is specified from the following conditions B and d.

Condition B

The reference position on the concave surface (for example, the design reference position on the concave surface) is arranged at a position on the normal line or a straight line substantially forming the normal line at the reference position on the convex surface (the prism measurement reference position P1, namely, the layout mark LM).

Condition d

The pair of the permanent marks PM is arranged at positions on a pair of straight lines parallel to the normal line or a straight line substantially forming the normal line at the reference position on the concave surface, which straight lines are located at the same distance from the reference position on the concave surface while sandwiching the reference position on the concave surface.

Figure 7:
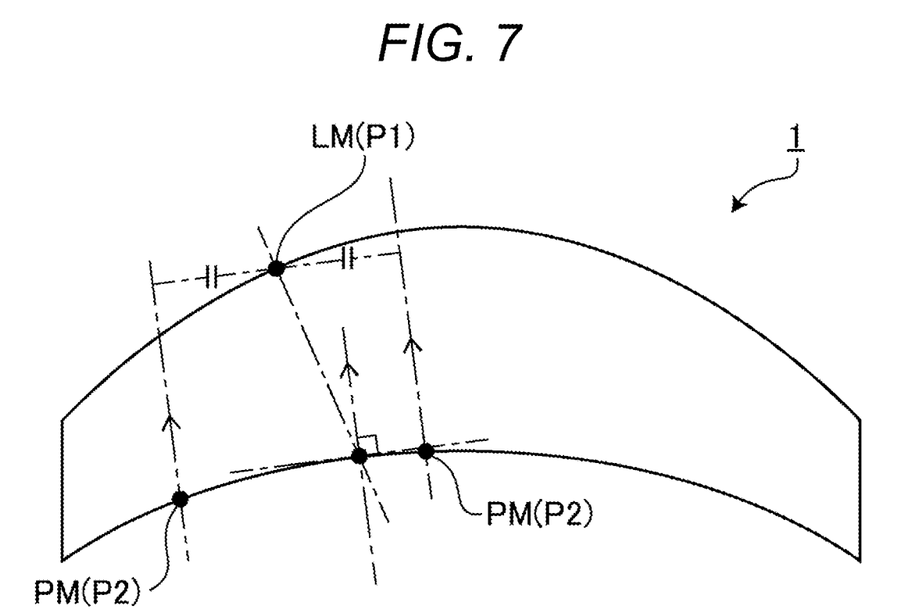
FIG. 7 is a diagram illustrating a positional relationship between the permanent marks etched on the concave surface of the uncut lens according to the embodiment of the invention and the layout mark LM painted on the convex surface thereof (fifth variation).

(FIG. 7: Fifth Variation)

The positional relationship according to the fifth variation is specified from the condition B and the following condition e.

Condition e

The pair of the permanent marks PM is arranged at positions on a pair of straight lines parallel to the normal line or a straight line substantially forming the normal line at the reference position on the concave surface, which straight lines are located at the same distance from the reference position on the convex surface while sandwiching the reference position on the convex surface.

Figure 8:
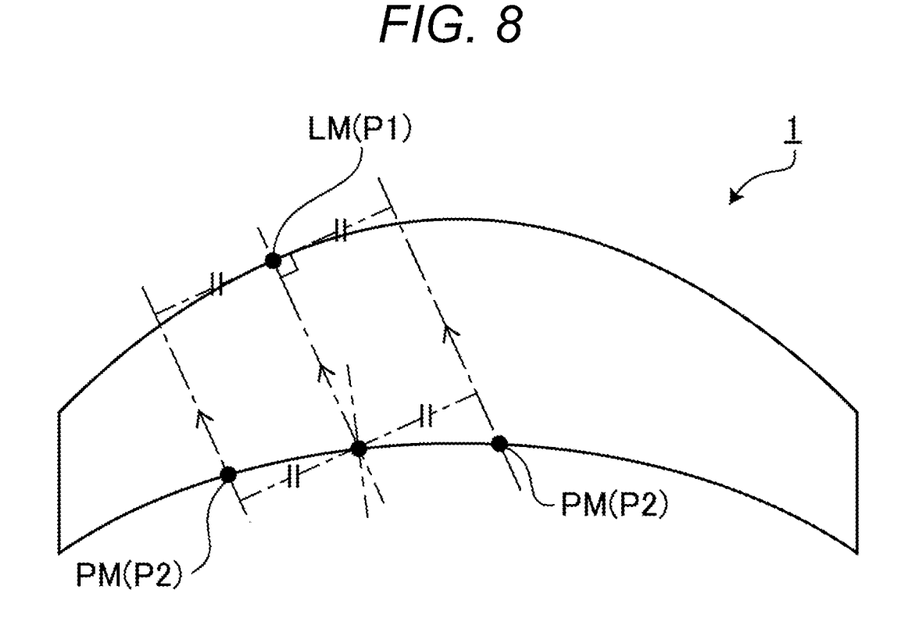
FIG. 8 is a diagram illustrating a positional relationship between the permanent marks etched on the concave surface of the uncut lens according to the embodiment of the invention and the layout mark LM painted on the convex surface thereof (sixth variation).

(FIG. 8: Sixth Variation)

The positional relationship according to the sixth variation is specified from the condition B and the following condition f.

Condition f

The pair of the permanent marks PM is arranged at positions on a pair of straight lines parallel to the normal line or a straight line substantially forming the normal line at the reference position on the convex surface, which straight lines are located at the same distance from the reference position on the convex surface (or on the concave surface) while sandwiching the reference position on the convex surface (or on the concave surface).

(Supplementary Description Regarding Allowable Tolerance)

As illustratively described in the section of (FIG. 3: First Variation), the layout mark LM (the reference position on the convex surface) is arranged at a position contained within the circular region R (allowable tolerance) in which a position without any error at all (in the case of the first variation, the position on the normal line at the reference position on the concave surface) and the slope is ±5° (more preferably, ±1°). In other words, the normal line for specifying the position of the layout mark LM may be a straight line in a direction including a slight error (namely, the aforementioned "straight line substantially forming the normal line at the reference position") and, in line with this, a slight error is allowed for the position of the layout mark LM (that is, the layout mark LM may be arranged at a position slightly de-centered relative to the position without any error).

To give a more detailed example regarding the allowable tolerance, in a case where prism power ranges from 0 to 2.00Δ in prescription and spherical power S is 8.0 dpt, an amount of de-centering (amount of position shift) relative to the position without any error is allowed up to ±1.3 mm for the position of the layout mark LM (according to another viewpoint, an error up to such an extent that the aforementioned amount of de-centering falls within ±1.3 mm is allowed for the normal line direction for specifying the position of the layout mark LM). Meanwhile, in a case where the prism power ranges from 0 to 2.00Δ in prescription and the spherical power S is 4.0 dpt, the amount of de-centering (amount of position shift) relative to the position without any error is allowed up to ±1.6 mm for the position of the layout mark LM (according to another viewpoint, an error up to such an extent that the aforementioned amount of de-centering falls within ±1.6 mm is allowed for the normal line direction for specifying the position of the layout mark LM). In addition, in a case where the prism power ranges from 0 to 2.00Δ in prescription and the spherical power S is 1.0 dpt, the amount of de-centering (amount of position shift) relative to the position without any error is allowed up to ±3.5 mm for the position of the layout mark LM (according to another viewpoint, an error up to such an extent that the aforementioned amount of de-centering falls within ±3.5 mm is allowed for the normal line direction for specifying the position of the layout mark LM). The grounds for the ranges of the numerical values for the allowable amount of de-centering include Table 3: Allowable Difference of Prism Power in section 4.2.3 of "JIS T 7313:2000 Ophthalmic optics—Uncut finished spectacle lenses—Single-vision lenses" (display value of prism power (Δ): 0.00 to 2.00, prism allowable difference (Δ): ±(0.25+0.1×S max), where S max represents principal meridian power having a larger absolute value of the allowable difference between the allowable difference in a horizontal direction and the allowable difference in a vertical direction). Note that the above grounds are not limited to the case of the single-vision lens but also applied, by analogy, to the allowable tolerance of the layout marks LM in lenses of other types, including the progressive power lens and a bifocal lens.

The illustrative embodiments according to the invention have been described thus far. The embodiments according to the invention are not limited to those described above and can be variously modified without departing from the technical concept of the invention. For example, practices obtained by combining the working examples and the modifications illustratively and clearly stated in the present description or self-evident working examples and modifications as appropriate are also included in the embodiments according to the present application.

Although the above-described embodiments have exemplified the lens including the concave surface having a surface shape of non-symmetry, the invention is not limited thereto. Illustratively, a lens having a shape with the concave surface including only one symmetric plane is also included in the scope of the invention. As an example of the lens having the shape with the concave surface including only one symmetric plane, a lens with mirror symmetry between an upper part and a lower part (for example, some sports glasses suitable for being framed into a wrap-around type spectacle frame) is considered. Because the spectacle lens of this type has a considerably steep curve, the position of the virtual image of the permanent mark appearing on the convex surface varies to a larger extent from a proper position where the virtual image is supposed to appear, depending on parallax due to refraction or the like, an angle at which the operator visually confirms the convex surface and so on. Accordingly, when the layout mark LM is painted at the reference position on the convex surface in the spectacle lens of this type, a still larger effect of the improvement is achieved in the accuracy of power measurement and the accuracy of check of the fitting point with a lens meter.

The invention claimed is:

1. A spectacle lens comprising:
    a permanent mark etched on a concave surface such that the permanent mark includes a depression on the concave surface, the permanent mark including a first permanent mark and a second permanent mark, the first permanent mark and the second permanent mark being arranged on the concave surface as a pair; and
    a layout mark indicating a predetermined reference position on a convex surface arranged on the convex surface, an alignment measurement reference position of the layout mark being positioned at a midpoint on a line connecting virtual images of the first permanent mark and the second permanent mark appearing on the convex surface when the convex surface is viewed from a predetermined direction, wherein
    the layout mark is removable from the convex surface, and
    the concave surface is formed as a progressive surface having a design center shifted from a geometric center of the lens.

2. The spectacle lens according to claim 1, wherein respective positions of the permanent mark and the layout mark are defined in such a manner that one position is defined on the basis of the other position.

3. The spectacle lens according to claim 1, wherein a reference position on the concave surface defined on the basis of the permanent mark and the reference position on the convex surface indicated by the layout mark are arranged in such a manner that one reference position is arranged at a position on a normal line or a straight line substantially forming the normal line at the other reference position.

4. The spectacle lens according to claim 1, wherein:
    the first permanent mark and the second permanent mark are arranged at positions on the concave surface indicated by one of conditions (1) and (2):
    (1) a pair of positions on the concave surface located on straight lines parallel to a normal line or a straight line substantially forming the normal line at a reference position on the concave surface while sandwiching one of the reference position on the concave surface and the reference position on the convex surface; and
    (2) a pair of positions on the concave surface located on straight lines parallel to a normal line or a straight line substantially forming the normal line at the reference position on the convex surface while sandwiching one of the reference position on the concave surface and the reference position on the convex surface.

5. The spectacle lens according to claim 1, wherein the progressive surface is defined such that a refractive power changes progressively between a first region and a second region of the progressive surface.

* * * * *